United States Patent [19]
Tanaka et al.

[11] 4,453,243
[45] Jun. 5, 1984

[54] LINEAR TRACKING ARM DRIVE APPARATUS

[75] Inventors: Naoki Tanaka, Kanagawa; Masatake Sasaki, Funabashi, both of Japan

[73] Assignee: Sony Corporation, Tokyo, Japan

[21] Appl. No.: 377,131

[22] Filed: May 11, 1982

[30] Foreign Application Priority Data

May 20, 1981 [JP] Japan .................................. 56-76116

[51] Int. Cl.³ .............................................. G11B 3/38
[52] U.S. Cl. .................................... 369/221; 369/219; 369/249
[58] Field of Search ............... 369/215, 216, 225, 226, 369/249, 219, 221, 223

[56] References Cited
U.S. PATENT DOCUMENTS 3,870,320  3/1975  Torrington .......................... 369/221
4,199,149  4/1980  Ohsawa ............................... 369/220

Primary Examiner—Steven L. Stephan
Attorney, Agent, or Firm—Lewis H. Eslinger; Alvin Sinderbrand

[57] ABSTRACT

In a record disc player, a pick-up arm is mounted for movement to and fro along a rectilinear path, a drive assembly is actuable for driving the arm along such path, first and second motors are alternatively operated, and a drive speed change-over mechanism selectively transmits driving torque from the operated one of the first and second motors to the drive assembly so that the pick-up arm can be stably driven at a relatively low speed by operation of one of the motors during the playing or reproducing of signals from a record disc, and high speed movement of the pick-up arm is effected upon operation of the other motor during lead-in and return operations of the player.

10 Claims, 6 Drawing Figures

LINEAR TRACKING ARM DRIVE APPARATUS

BACKGROUND OF THE INVENTION

1. Field of the Invention

This invention relates generally to a record disc player for reproducing audio, video or other information signals on a rotated disc by means of a pick-up carried by an arm for tracing or tracking the path or groove in which the signals are recorded, and the invention is more particularly directed to an improved drive apparatus for effecting movements of the pick-up arm.

2. Description of the Prior Art

It is known to provide a record disc player with a so-called linear tracking pick-up arm which is mounted so that the stylus of the pick-up at the free end of the arm will move substantially along a radius of the record disc when tracking or tracing a spiral record groove on the latter. In order to achieve such linear tracking, the end of the pick-up arm remote from the pick-up or cartridge is mounted for movement along a straight guide shaft which is substantially parallel to a radius of the record disc and from which the pick-up arm extends substantially at right angles to the axis of the guide shaft. During the playing or reproducing of the recorded signal, that is, when the record groove is being traced, the arm is driven along the guide shaft at a relatively slow speed, which is normally 0.05 mm/sec. On the other hand, during lead-in, that is, when the pick-up or cartridge is being moved from its rest position to an initial position where its stylus first engages the record groove adjacent the outer periphery of the record disc, and also during return, that is, when the pick-up is moved back to its rest position after completion of the playing or reproducing of all of the recorded signals, the arm is driven at a high speed which is normally 100 mm/sec. It will be seen that the speed at which the arm is driven during lead-in and return is about 2000 times the speed at which the arm is driven during actual playing or reproducing. Such great difference in the speeds at which the arm must be driven during playing or reproducing and during lead-in and return, respectively, leads to substantial problems. More particularly, if the arm is to be driven by a single motor, as in a conventional apparatus, it is not possible to provide the motor with a speed servo control circuit having an effective range large enough to encompass the desired drive speeds for playing and for lead-in and return, respectively. Therefore, in the case of an existing linear tracking arm drive apparatus employing a single motor, the drive speed of the arm during lead-in and return is substantially required, that is, is substantially less than 100 mm/sec., so that the time required for an operating cycle of the record disc player is undesirably increased thereby.

In another proposed linear tracking arm drive apparatus, the rotational torque of the motor for driving the arm along the guide shaft is applied through a magnetic clutch and, during the playing or reproducing operation, an electromagnetic brake is suitably controlled to reduce the speed of movement of the arm while causing slipping of the magnetic clutch. However, in such arrangement, variations occur in the arm drive speed and the drive torque so that there is an undesirable lack of stability in the driving of the arm during playback or reproducing with the result that the tone quality of the reproduced sound is degraded.

OBJECTS AND SUMMARY OF THE INVENTION

Accordingly, it is an object of the present invention to provide a record disc player with a linear tracking arm drive apparatus which avoids the foregoing problems of the prior art.

More particularly, it is an object of this invention to provide a linear tracking arm drive apparatus for a record disc player which is capable of effecting movements of the pick-up arm over a wide range of speeds while ensuring that the arm will be driven stably at a relatively low speed during the playing or reproducing operation.

Another object is to provide a linear tracking arm drive apparatus, as aforesaid, in which a relatively simple and compact drive speed change-over mechanism is included for obtaining the desired large difference between the speed at which the arm is driven during actual playing or reproducing and the speed at which the arm is driven during lead-in and return.

A further object is to provide a linear tracking arm drive apparatus, as aforesaid, in which the change-over from one drive speed to another can be automatically effected, for example, merely by causing operation of one or the other of two motors.

In accordance with an aspect of this invention, a linear tracking arm drive apparatus for a record disc player comprises a pick-up arm mounted for movement to and fro along a rectilinear path, drive means for driving said arm along said path, first and second alternatively operated motors, and drive speed change-over means for selectively transmitting driving torques from said first and second motors to said drive means, whereby to move the arm along said path at a relatively slow speed when the first motor is operated and at a relatively fast speed when the second motor is operated.

Since the above linear tracking arm drive apparatus according to this invention employs the drive speed change-over means to selectively transmit driving torque from the first and second motors to the drive means, the arm can be driven at a suitably slow speed during playing or reproducing and at a relatively high speed during lead-in and return. Thus, a servo circuit may be conveniently provided for controlling the speed of the motor by which the arm is driven during playing or reproducing operation without limiting the range of drive speeds of the arm, that is, without undesirably limiting the high speed of the arm during lead-in and return, so that undesirable delays in the operating cycle are avoided.

Further, since the torques of the first and second motors are selectively transmitted to the drive means through the drive speed change-over mechanism, the motor which is operated at any time is not loaded by the other motor and also the movement of the arm is not resisted by a braking means, as in the previously described existing linear tracking arm drive apparatus. Therefore, there are substantially no changes in the drive torque applied to the arm and in the drive speed of the latter, and the arm is driven in a stable manner during playing or reproducing for improving the tone quality of the reproduced signals.

In a preferred embodiment of the invention, the drive speed change-over means for providing the desired large difference between the speed at which the arm is driven during playing or reproducing and the speed at which the arm is driven for lead-in and return is in the form of a planetary gear mechanism comprising a rotatable sun gear operatively connected with the first motor, an internal gear coaxial with the sun gear and operatively connected with the drive means, rotatable planetary gears disposed between, and meshing with the sun gear and internal gear, and a rotary body coaxial with the sun gear and internal gear and rotatably carrying the planetary gears, such rotary body being operatively connected with the second motor.

Further, in a preferred embodiment of this invention, first irreversible transmission means are interposed between the first motor and the sun gear, and second irreversible transmission means are interposed between the second motor and the rotary body, and each of the irreversible transmission means may be constituted by a worm coupled with the respective motor and a worm gear meshing with the worm to be rotated by the latter upon operation of the respective motor. By reason of the foregoing, the outputs or torques of the first and second motors are selectively transmitted to the sun gear and the rotary body merely by selectively driving the first and second motors. In other words, when the first motor is operated to rotate the sun gear, the rotary body will be maintained at rest due to the irreversible transmission means between the rotary body and the second motor, whereas, when the second motor is operated to rotate the rotary body, the sun gear will be maintained at rest by reason of the irreversible transmission means between the sun gear and the first motor. Therefore, change-over of the driving speed of the pick-up arm from one to the other of two speeds which have a large difference therebetween so as to be suitable for the playing or reproducing operation and for the lead-in and return, respectively, can be simply and automatically achieved merely by selectively driving the first and second motors.

The above, and other objects, features and advantages of the invention, will be apparent in the following detailed description of an illustrative embodiment of the invention which is to be read in connection with the accompanying drawings wherein the same reference numerals are employed to identify the corresponding parts in the several views.

DETAILED DESCRIPTION OF THE PREFERRED EMBODIMENT

Figure 1:
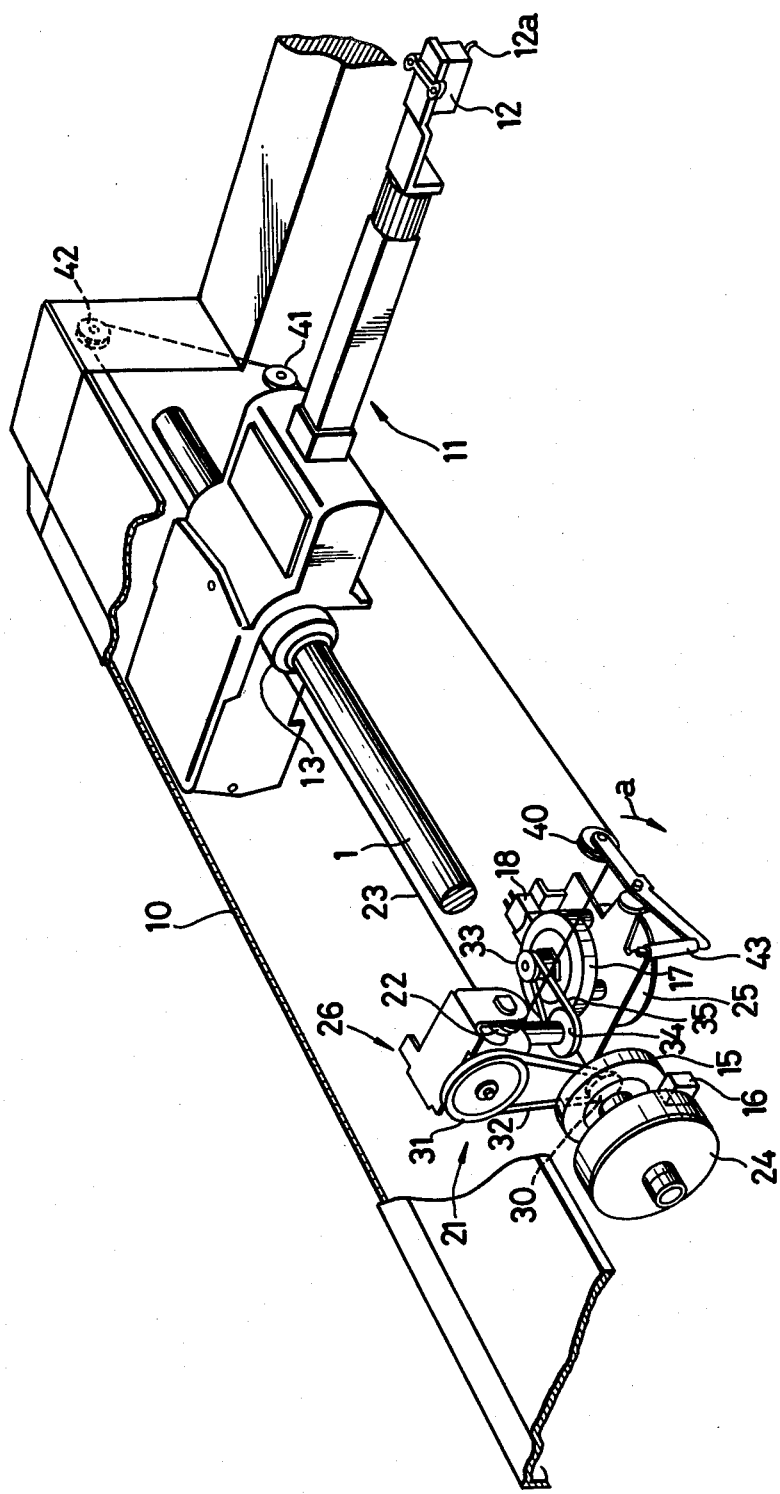
FIG. 1 is a perspective view which is partly broken away and in section and which shows a linear tracking arm and a drive apparatus therefor in accordance with an embodiment of this invention.

Referring initially to FIG. 1, it will be seen that a guide shaft 1 is horizontally mounted, at its ends, in a frame 10 of a record disc player so as to be disposed in back of a rotary turntable (not shown) with the axis of guide shaft 1 extending parallel to a radius of the turntable. An arm 11 carrying a pick-up or cartridge 12 at one end is suitably mounted, at its other end, on a slide member 13 which is slidable axially along guide shaft 1. Thus, arm 11 is movable rectilinearly along the straight guide shaft 1 while extending substantially at right angles to the axis of the latter. In the course of such movement of arm 11, a stylus 12a of pick-up 12 is movable rectilinearly along a radius of a record disc on the turntable, for example, when tracing or tracking a spiral record groove on the record disc.

Also mounted in frame 10, adjacent one end of guide shaft 1, is an arm drive apparatus 21 for driving arm 11 to and fro along guide shaft 1. Arm drive apparatus 21 is shown to have an output pulley 22 which engages an elongated flexible drive element 23 in the form of a slender cable of string having its ends connected to slide member 13 and being made to follow a closed course which includes a run extending along guide shaft 1 so that rotation of output pulley 22, in one direction or the other, as hereinafter described in detail, is effective to move slide member 13 along shaft 1 and thereby effect rectilinear movements of arm 11 and of pick-up 12 thereon.

Arm drive apparatus 21 is shown to generally comprise first and second alternatively operated motors 24 and 25, and a drive speed change-over mechanism 26 which selectively transmits torque from the first and second motors 24 and 25, whichever is operated, to pulley 22. As is hereinafter described in detail, during the normal playback or reproducing operation of the record disc player, arm 11 is driven at a relatively low speed by motor 24 through drive speed change-over mechanism 26 and, during a lead-in or return operation, arm 11 is driven at a relatively high speed by motor 25 through drive speed change-over mechanism 26. In each of these modes of driving operation, the rotation of pulley 22 at the output of drive speed change-over mechanism 26 is effective, by engagement of pulley 22 with cable or string 23, to drive arm 11 rectilinearly along guide shaft 1.

For detecting the speed of operation of first motor 24, a frequency generator, for example, in the form of a permanent magnet 15, is secured on the shaft of motor 24 and cooperates with a coil or head 16 fixedly disposed adjacent the rotational path of magnet or generator 15 so that, when motor 24 is operated, head or coil 16 produces signal pulses with a frequency which corresponds to the speed of rotation of motor 24. Similarly, a frequency generator in the form of a permanent magnet 17 is fixed on the shaft of second motor 25 and cooperates with a head or coil 18 which is fixedly mounted adjacent the periphery of magnet 17 to provide signal pulses of a frequency corresponding to the rotational speed of motor 25 during operation of the latter.

Also mounted on the shaft of motor 24 is a relatively small diameter pulley 30 which drives a relatively larger diameter pulley 31 of drive speed change-over mechanism 26 by way of a flexible belt 32 running therearound. Similarly, a relatively small diameter pulley 33 fixed on the shaft of motor 25 drives a pulley 34 of mechanism 26 by way of a flexible belt 35 running therearound. Pulley 34 desirably has a diameter somewhat smaller than that of pulley 31. As shown particularly on FIG. 1, the elongated flexible drive element in the form of cable or string 23 is guided, in its closed course, by means of guide pulleys 40, 41 and 42, as well as by drive pulley 22 about which cable or string 23 is wrapped. Tension is maintained in string 23 by mounting guide pulley 40 on a pivoted lever which is urged by a tension spring 43 in the direction of the arrow a. Thus, cable or string 23 is maintained in close engagement with pulley 22 so as to be surely driven in response to rotation of the latter.

Figure 2:
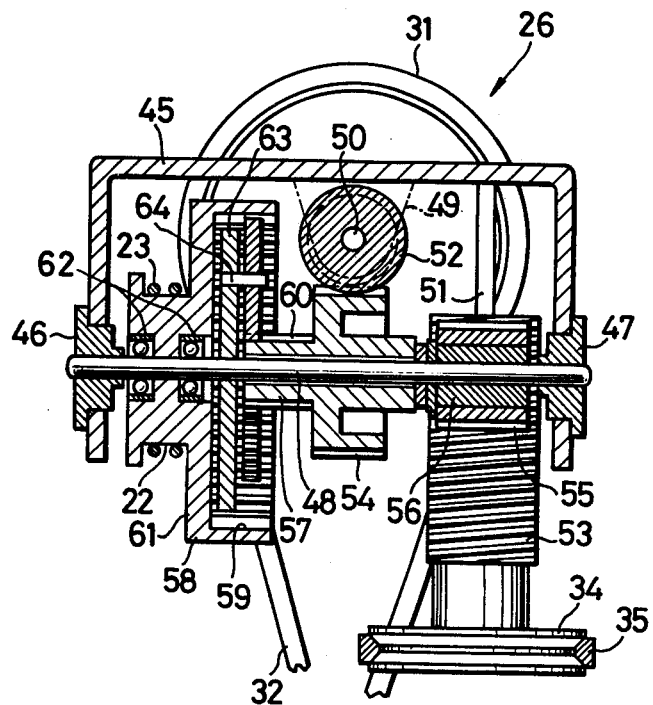
FIG. 2 is a vertical sectional view of a drive speed change-over mechanism included in the linear tracking arm drive apparatus of FIG. 1.
Figure 3:
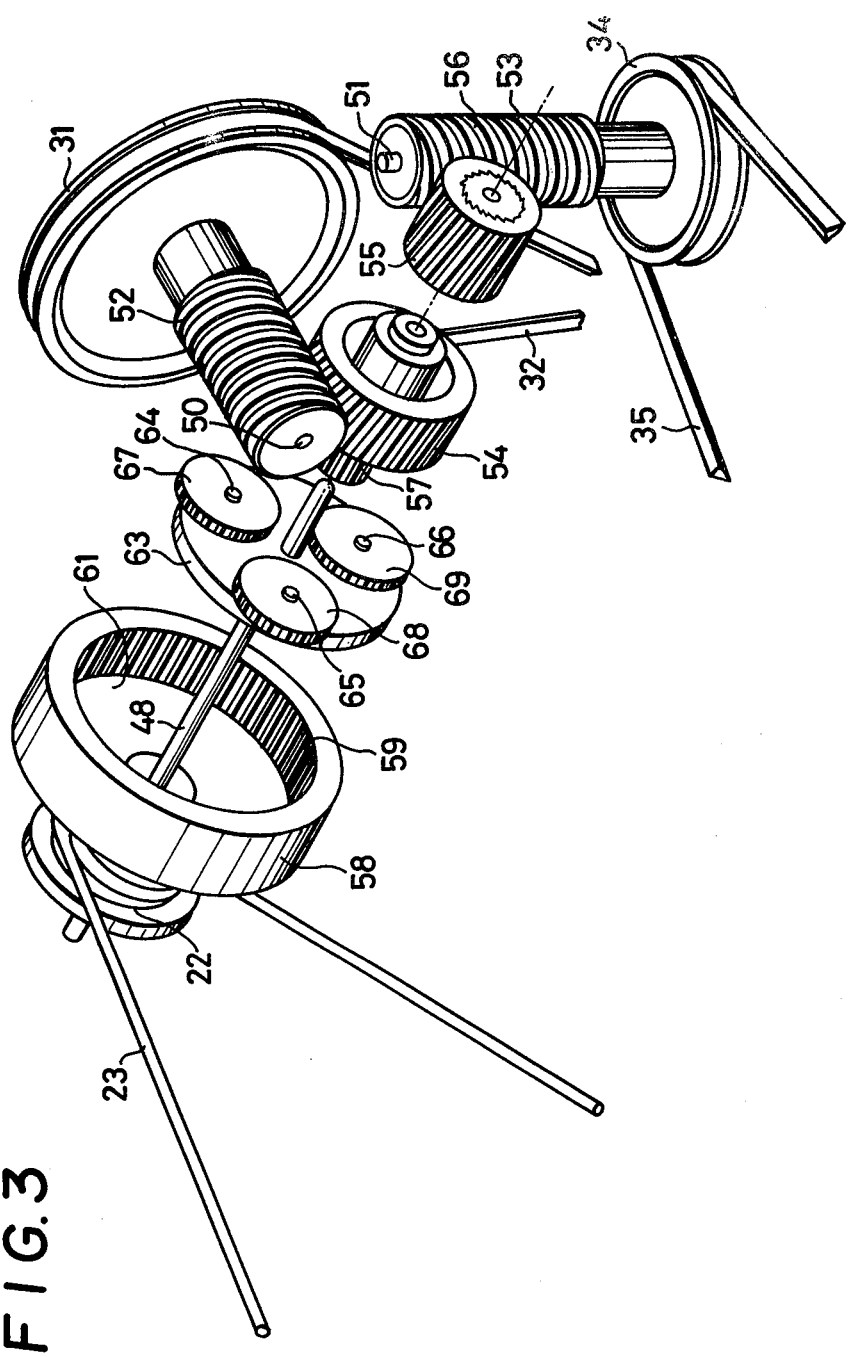
FIG. 3 is an exploded perspective view of elements included in the drive speed change-over mechanism of FIG. 2.

As shown particularly on FIG. 2, drive speed change-over mechanism 26 further includes a support plate 45 of inverted U-shaped configuration which, in its side arm, carries bearings 46 and 47 having the opposite end portions of a horizontal shaft 48 respectively journaled therein. A bracket 49 depends integrally from the central portion of support plate 45, and a horizontal shaft 50 is fixed, at one end, to bracket 49 and extends from the latter perpendicular to shaft 48, with pulley 31 being free to rotate on shaft 50. A vertical shaft 51 is fixed, at its upper end, to support plate 45 at the right-hand side of bracket 49, as viewed on FIG. 2, and is perpendicular to each of the shafts 48 and 50, with pulley 34 being freely rotatable on the lower end portion of shaft 51. As shown on FIGS. 2 and 3, worms 52 and 53 are formed integrally with pulleys 31 and 34, respectively, and are rotatable therewith on shafts 50 and 51, respectively. A worm gear or wheel 54 meshes with worm 52 and is mounted on shaft 48 for rotation relative to the latter. A worm gear or wheel 55 meshes with worm 53 and is mounted on shaft 48 at a location axially next to worm wheel 54. However, worm wheel 55 is rotatably coupled with shaft 48, for example, by having a serrated bore which engages a similarly serrated surface on a collar 56 fixed to shaft 48.

A sun gear 57 is integrally coaxial with worm wheel 54 at the side of the latter facing away from worm wheel 55. An integral gear 58 has teeth 59 formed in the inner annular surface of a flange extending axially from one side of a disc 61 which is coaxially integral with output pulley 22 and rotatably mounted with the latter on shaft 48 by means of ball bearing 62 (FIG. 2). A disc-shaped rotary body 63 is fixed on rotatable shaft 48 adjacent the inner surface of disc 61 and carries stub shafts 64, 65 and 66 (FIG. 3) extending axially from rotary body 63 in the direction away from disc 61 and being equally spaced from each other at equal distances from the axis of shaft 48. Planetary gears 67, 68 and 69 are freely rotatable on stub shafts 64, 65 and 66, respectively, and are dimensioned so as to mesh simultaneously with internal teeth 59 of gear 58 and with teeth 60 of sun gear 57 which extends axially on shaft 48 between planetary gears 67–69.

Figure 5:
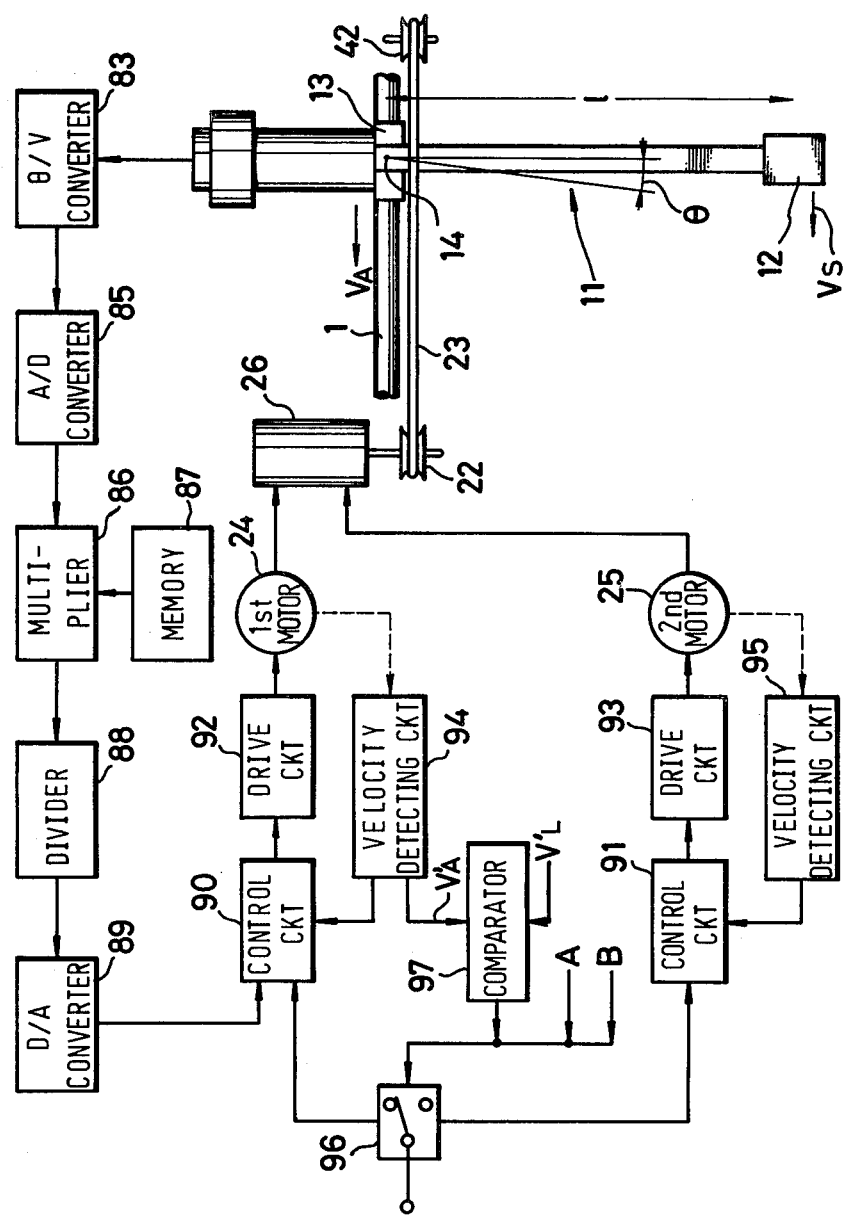
FIG. 5 is a schematic block diagram of a servo system and control circuit provided for first and second motors included in the linear tracking arm drive apparatus according to this invention.

Referring now to FIG. 5, it will be seen that arm 11 is desirably mounted, at the end connected to slide member 13, for pivotal movement relative to the latter about a pivot axis 14 which is substantially parallel to the axis of rotation of a record disc on the turntable (not shown). As a matter of fact, arm 11 is also desirably mounted for pivoting about an axis parallel to the axis of guide shaft 1, that is, for moving the pick-up 12 substantially perpendicular to the surface of the record disc, but this last mentioned pivotal movement of arm 11 is not directly related to the present invention and, therefore, a more detailed description thereof will be omitted. In any case, by reason of the mounting of arm 11 for pivoting relative to slide member 13 about axis 14, any difference between the velocity $V_S$ with which the stylus of pick-up 12 is moved by its engagement with the spiral record groove of the rotated record disc being played or reproduced and the velocity $V_A$ with which slide member 13 and pivot axis 14 are moved along guide shaft 1 by the arm drive apparatus 21 will cause an angular displacement $\theta$ of arm 11 from its intended right-angular relationship to the axis of guide shaft 1.

As shown schematically on FIG. 5, a $\theta/V$ converter 83 is associated with arm 11 to detect the angle $\theta$ of displacement of arm 11 from its right angular relationship to the axis of guide shaft 1 and to convert the detected angle $\theta$ to a corresponding voltage. The voltage output of converter 83 is applied to a servo system for controlling motor 24 so that, during the driving of arm 11 by the operation of motor 24, as hereinafter described in detail, the speed of motor 24 is servo controlled to maintain arm 11 perpendicular to the axis of guide shaft 1 as slide member 13 is moved along shaft 1 and stylus 12a of pick-up 12 traces the record groove.

More particularly, the servo system for motor 24 is shown on FIG. 5 to include an analog/digital converter 85 by which the voltage output of converter 83 is converted to a corresponding digital value representing the angle $\theta$. That digital value is supplied to a multiplier 86 in which the digital data representing the angle $\theta$ is multiplied by date from a memory 87 representing the distance l from pivot axis 14 to stylus 12a. The output of multiplier 86 representing ($\theta$.l) is supplied to a divider 88 to be divided in the latter by a predetermined time t which may be, for example, 0.1 sec. Since the output ($\theta$.l) of multiplier 86 approximately represents the distance the stylus 12a moves radially inward on the record disc relative to the corresponding movement of pivot axis 14 along the parallel path defined by guide shaft 1, the output ($\theta$.l)/t of divider 88 represent the velocity difference $V_G$ between the velocity $V_A$ of the pivot axis 14 and velocity $V_S$ of the stylus 12a during a playback or reproducing operation.

The resulting digital data representing velocity difference $V_G$ is supplied from divider 88 to a digital/analog converter 89 for conversion to an analog signal, which is, in turn, supplied to a control circuit 90 for generating a corresponding control signal. Such control signal from circuit 90 is supplied to a drive circuit 92 for motor 24 so as to suitably vary the speed of the latter. Further, the operating speed of motor 24, and hence the speed $V_A$ at which pivot axis 14 of arm 11 is being moved, is detected by means of a velocity detecting circuit 94 which receives the previously described signal pulses generated by head 16. The resulting velocity detection signal is supplied from circuit 94 to control circuit 90 so that motor 24 may also be automatically controlled thereby.

The operation of second motor 25 is controlled by a control circuit 91 through a drive circuit 93. A velocity detecting circuit 95 is responsive to the signal pulses provided by head 18 to detect the speed of arm 11 during lead-in and return movements and provides a corresponding signal to control circuit 91 by which the speed of motor 25 is controlled to maintain a desired speed of movement of arm 11 during lead-in and return movements. A change-over switch 96 is provided to selectively supply power to control circuits 90 and 91, and thereby selectively cause operation of motors 24 and 25, respectively. A comparator 97 receives a signal $V'_A$ from velocity detecting circuit 94 which corresponds to the velocity $V_A$ at which the pivot axis 14 of arm 11 is moved along guide shaft 1 in response to operation of motor 24 during playback or reproducing operation. Comparator 97 compares such signal $V'_A$ with a predetermined or reference signal $V'_L$ corresponding to a predetermined reference velocity $V_L$, for example, of 1.6 mm/sec. If the velocity $V_A$ at which pivot axis 14 of arm 11 is moved during playback or reproducing becomes larger than reference velocity $V_L$, comparator 97 provides a suitable switching signal to change-over switch 96 by which the latter is changed-over from the position shown on FIG. 5 so as to supply power to control circuit 91 and thereby effect operation of motor 25. Change-over switch 96 may also be manually operated in response to a FF (fast-forward) instruction signal A or a play instruction signal B selectively applied to change-over switch 96 in response to actuation of respective push-buttons (not shown).

Figure 4A:
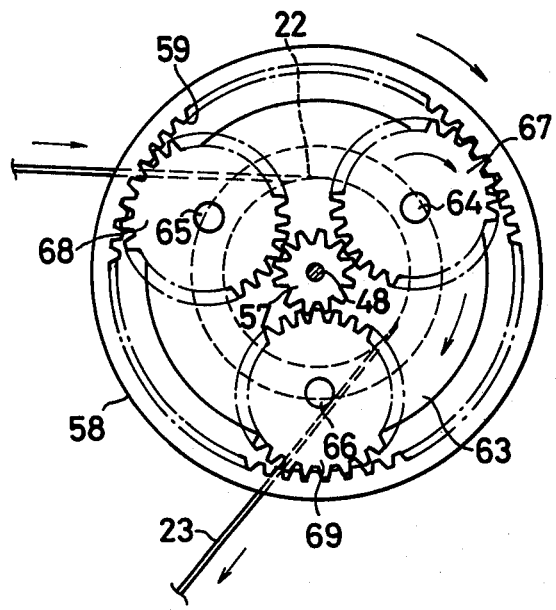
FIGS. 4A and 4B are side elevational views of a planetary gear mechanism included in the drive speed change-over mechanism of FIGS. 2 and 3, and to which reference will be made in explaining the operations thereof.

The above described linear tracking arm apparatus 21 in accordance with this invention operates as follows:

In response to the application of a play instruction signal B to change-over switch 96, the latter is changed-over from the condition shown on FIG. 5 so as to cause operation of second motor 25 for initiating a lead-in operation of arm 11. The torque of motor 25 is transmitted from pulley 33 to pulley 34 through belt 35 (FIG. 1), and is then further transmitted through worm 53, worm wheel 55 and shaft 48 to rotary body 63 so that shafts 64-66 with planetary gears 67-69 thereon are moved in an orbital path, as shown on FIG. 4A. At such time, sun gear 57 is not rotated since worm wheel 54 integral therewith meshes with worm 52 to form an irreversible transmission means. Accordingly, planetary gears 67, 68 and 69 are rotated about shafts 64, 65 and 66, respectively, in the clockwise direction, as viewed on FIG. 4A, in response to their revolving movement about stationary sun gear 57, and internal gear 58 is rotated in the clockwise direction by the rotated planetary gears. At such time, the speed of rotation of internal gear 58 is the sum of the speed of rotation of planetary gears 67-69 and the speed of revolution of such gears about the axis of shaft 48. Thus, pulley 22 integral with internal gear 58 is rotated faster than rotary body 63 for driving the flexible element or string 23 at a relatively high speed and similarly moving arm 11 at a relatively high speed for fast lead-in of the stylus 12a of pick-up 12 to the initial end of the record groove adjacent the outer periphery of the record disc. In a practical example of an arm drive apparatus according to this invention, the ratio of the rotational speed of pulley 22 to the rotational speed of pulley 34 during operation of second motor 22 is chosen to be approximately 1:10 by suitably selecting the numbers of teeth on worm wheel 55 and planetary gears 67-69, so as to achieve a speed of movement of arm 11 of about 100 mm/sec. for the lead-in operation and also for the later described return operation.

Figure 4B:
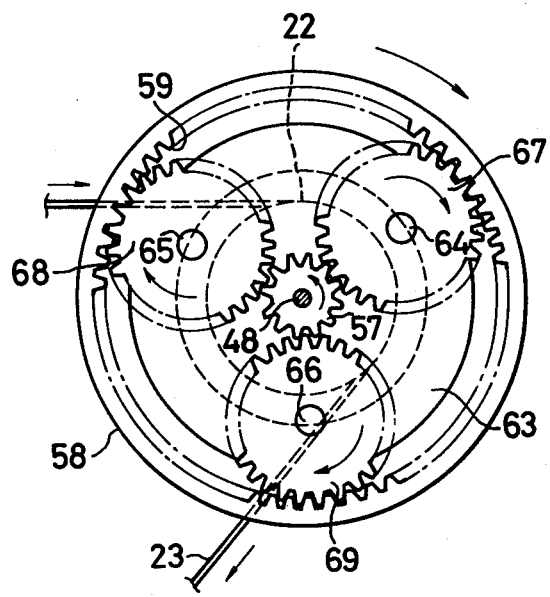

When the stylus 12a of pick-up or cartridge 12 is engaged in the initial end of the record groove adjacent the outer periphery of the record disc, a suitable arrangement automatically switches change-over switch 96 to the position shown on FIG. 5 for halting the operation of second motor 25 and applying power to control circuit 90 for effecting operation of first motor 24. The torque of first motor 24 is transmitted from pulley 30 to relatively large diameter pulley 31 through belt (FIG. 1), and then further transmitted through worm 52 to worm gear 54 for rotating sun gear 57 integral therewith about shaft 48. Thus, sun gear 47 is rotated in the counterclockwise direction, as viewed on FIG. 4B, and, at this time, shaft 48 is not rotated as worm gear 55 which is fixed thereto meshes with worm 53 to form an irreversible transmission means. Therefore, rotary body 63 is held against rotation with stationary shaft 48, and the counterclockwise rotation of sun gear 57 causes planetary gears 67-69, in mesh therewith, to be rotated in the clockwise direction (FIG. 4B). Thus, internal gear 58 and pulley 22 integral therewith are rotated slower than sun gear 57 and in the direction opposite to the latter, that is, in the clockwise direction as viewed on FIG. 4B, with the result that flexible drive element or string 23 is driven at a relatively low speed to similarly move pivot axis 14 at the relatively slow speed or velocity $V_A$ along guide shaft 1. In the previously mentioned practical example of the arm drive apparatus 21 according to this invention, the ratio of the rotational speed of pulley 22 to the rotational speed of pulley 31 during operation of motor 24 is chosen to be approximately 1:200 by suitably selecting the numbers of teeth on worm gear 54, sun gear 57 and planetary gears 67-69, whereby first motor 24 may be operated to drive arm 11 at the desired speed or velocity $V_A$ of substantially 0.05 mm/sec., without the need to provide the usual braking means associated with such motor.

While pivot axis 14 of arm 11 is being moved along guide shaft 1 at the velocity $V_A$ in response to operation of first motor 24, the stylus 12a of cartridge or pick-up 12 is being moved with a similar velocity $V_S$ of substantially 0.05 mm/sec. from the outer periphery of the record disc radially inward over the surface of the latter toward the inner periphery or margin of the recorded area by the engagement of the stylus with the spiral record groove. Whenever arm 11 is angularly displaced about pivot axis 14 from its desired right angular relationship to the axis of guide shaft 1 in response to any difference $V_G$ between the velocity $V_A$ of pivot axis 14 and the velocity $V_S$ of stylus 12a, the angle $\theta$ of such angular displacement is detected by converter 83 and, in response thereto, the previously described servo system is operated to suitably adjust the operating speed of motor 24 for making the velocity $V_A$ of pivot axis 14 again equal to the velocity $V_S$ of the stylus. In other words, the angle $\theta$ is detected to determine the extent to which the operating speed of motor 24 must be increased or decreased for making the velocity $V_A$ equal to the velocity $V_S$, with the direction of the angular displacement $\theta$ being detected for indicating whether the speed of motor 24 needs to be increased or decreased. It will be appreciated that, as a result of the foregoing, arm 11 is maintained at right angles to the axis of guide 1 while its pivot axis 14 is propelled along shaft 1 at precisely the same speed as that at which stylus 12a is moved inwardly by its engagement with the spiral record groove. Therefore, tracking error is prevented and irregularly reproduced or distorted sounds are avoided. Since pulley 22 and first motor 24 are continuously connected mechanically to each other during operation of motor 24, the torque of pulley 22 is not reduced during the servo control of motor 24 with the result that stable driving of arm 11 at a low speed is achieved during playback or reproducing operation.

When playback or reproducing of the recorded signal has been completed, that is, when stylus 12a nears the inner margin of the recorded area on the record disc, the velocity $V_S$ of stylus 12a is increased and the servo system associated with motor 24 correspondingly increases the speed of operation of motor 24 so as to seek to maintain the speed $V_A$ of movement of pivot axis 14 equal to such increased speed $V_S$. However, when the speed or velocity $V_A$ is thus increased to be larger than the reference velocity $V_L$, for example, greater than 1.6 mm/sec., as represented by the reference voltage $V'_L$, comparator 97 responds to the increase of voltage $V'_A$ from detecting circuit 94 above reference voltage $V'_L$ and changes-over switch 96 for halting the operation of motor 24 and commencing the operation of second motor 25. Thus, at the completion of playback or reproducing of the recorded signal, arm 11 is driven by second motor 25 at a relatively high speed for further moving stylus 12a toward the inner periphery of the record disc along the non-recorded or run-out portion of the record groove. When the stylus reaches the innermost turns of the run-out portion of the record groove, the velocity of movement of the stylus becomes zero and, in response thereto, arm 11 is automatically pivoted upward relative to slide member 13 in a conventional manner for removing the stylus from the surface of the record disc and, thereafter, the direction of operation of second motor 25 is reversed for the high speed return of arm 11 to its rest position. During the operation of second motor 25, it will be seen that such motor and pulley 22 are continuously mechanically connected with each other so that the torque of pulley 22 is not reduced and the movement of arm 11 at high speed can be attained.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A record disc player comprising a pick-up arm; means mounting said arm for movement to and fro along a rectilinear path; drive means for driving said arm along said path; first and second alternatively operated motors; and drive speed change-over means for selectively transmitting driving torques from said first and second motors to said drive means, said drive speed change-over means including a rotatable sun gear operatively connected with said first motor, an internal gear coaxial with said sun gear and operatively connected with said drive means, rotatable planetary gears disposed between, and meshing with said sun gear and internal gear, and a rotary body coaxial with said sun gear and internal gear and rotatably carrying said planetary gears, said rotary body being operatively connected with said second motor.

2. A record disc player according to claim 1; in which irreversible transmission means are interposed between said first motor and said sun gear and irreversible transmission means are interposed between said second motor and said rotary body.

3. A record disc player according to claim 2; in which each of said irreversible transmission means includes a worm coupled with the respective motor and a worm gear meshing with said worm to be rotated by the latter upon operation of said respective motor.

4. A record disc player according to claim 1; in which said means mounting the pick-up arm includes a guide shaft extending parallel with said rectilinear path, and slide means movable along said guide shaft and supporting one end of said pick-up arm with the latter extending substantially at right angles to the axis of said guide shaft; and in which said drive means includes a flexible drive element connected to said slide means and being guided in a closed course which includes a run extending along said guide shaft, and a drive pulley coupled rotatably with said internal gear and engaged with said flexible drive element for propelling the latter.

5. A record disc player according to claim 4; in which said pick-up arm has a stylus, at its other end, for tracing a record groove in a rotated record disc being played, and said one end of the pick-up arm is pivotally mounted on said slide means for limited angular displacement relative thereto about an axis substantially parallel to the axis of rotation of the record disc; and further comprising speed servo control means responsive to said angular displacement of said pick-up arm when said first motor drives said sun gear for controlling the speed of said first motor so as to maintain said arm at right angles to said axis of the guide shaft as said stylus traces the record groove.

6. A record disc player according to claim 5; in which said drive speed change-over means further includes first and second worms coupled with said first and second motors, respectively, to be selectively rotated by the respective motor upon operation of the latter, and first and second worm gears meshing with said first and second worms, respectively, and being rotatably coupled to said sun gear and said rotary body, respectively.

7. A record disc player according to claim 1; in which said means mounting the pick-up arm includes a guide shaft parallel with said rectilinear path, and slide means movable along said guide shaft and supporting one end of said pick-up arm with the latter extending substantially at right angles to the axis of said guide shaft; and in which said drive means connects said drive speed change-over means with said slide means to displace the latter along said guide shaft in response to operation of either one of said motors.

8. A record disc player according to claim 7; in which said pick-up arm has a stylus at its other end for tracing a record groove in a record disc being played while rotated in a plane parallel to said axis of the guide shaft, and said one end of the pick-up arm is pivotally mounted on said slide means for limited angular displacement relative thereto about an axis substantially parallel to the axis of rotation of the record disc; and further comprising speed servo control means responsive to said angular displacement of said pick-up arm when said first motor is operated for controlling the speed of said first motor so as to maintain said arm at right angles to said axis of the guide shaft as said stylus traces the record groove.

9. A record disc player according to claim 8; further comprising change-over switch means having first and second states for effecting operation of said first and second motors, respectively, and means responsive to the speed of operation of said first motor for switching said change-over switch means from said first state to said second state when said speed of operation of said first motor exceeds a predetermined value.

10. A record disc player according to claim 1; in which said drive speed change-over means is operative to cause said drive means to move said arm along said path at a relatively slow speed when said first motor is operated and at a relatively fast speed when said second motor is operated.

* * * * *